July 6, 1937.   J. P. THOMPSON   2,086,142
MOTOR VEHICLE ELEVATING AND PARKING DEVICE
Filed Nov. 28, 1934   3 Sheets-Sheet 1

INVENTOR.
JOHN P. THOMPSON.
BY Allen & Allen
ATTORNEYS.

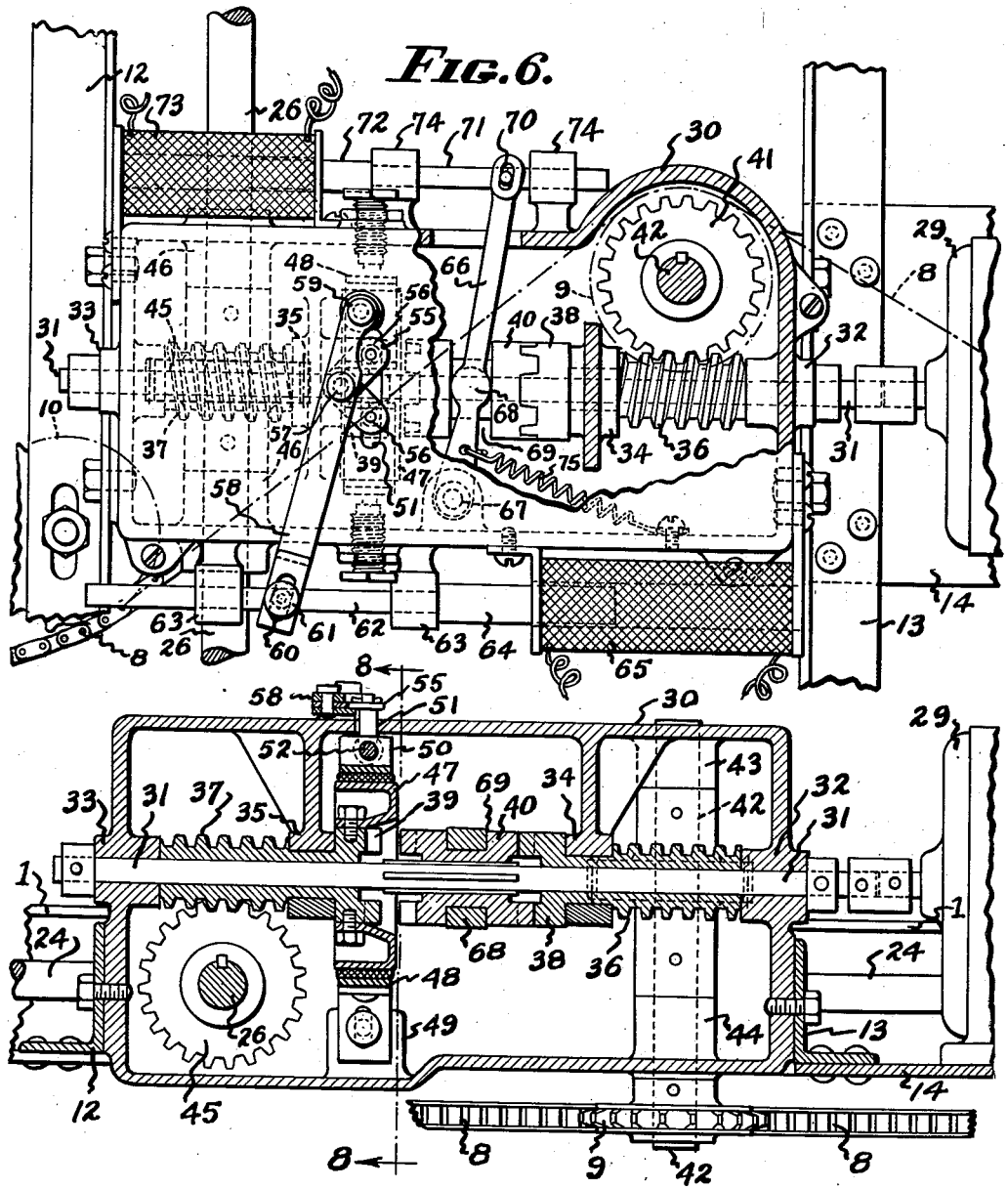

July 6, 1937.  J. P. THOMPSON  2,086,142
MOTOR VEHICLE ELEVATING AND PARKING DEVICE
Filed Nov. 28, 1934   3 Sheets-Sheet 3
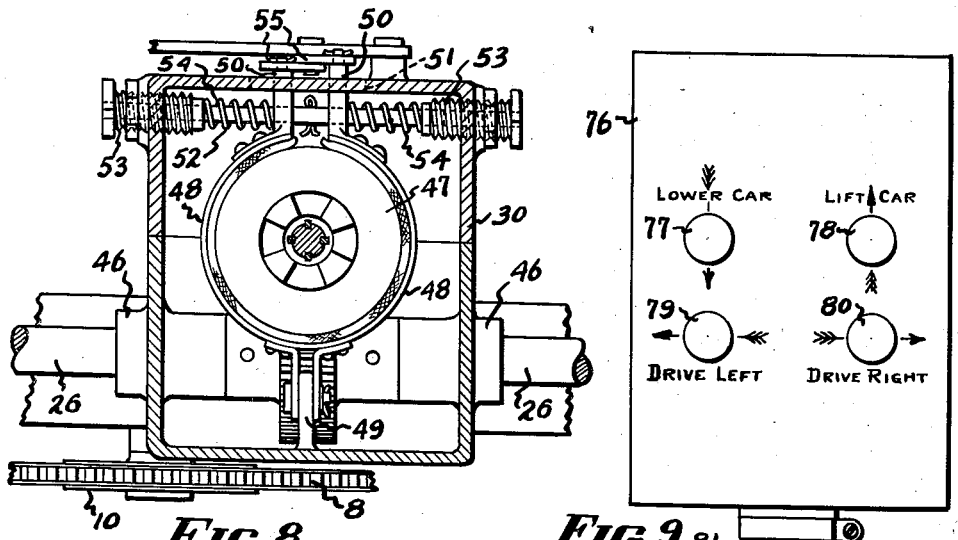
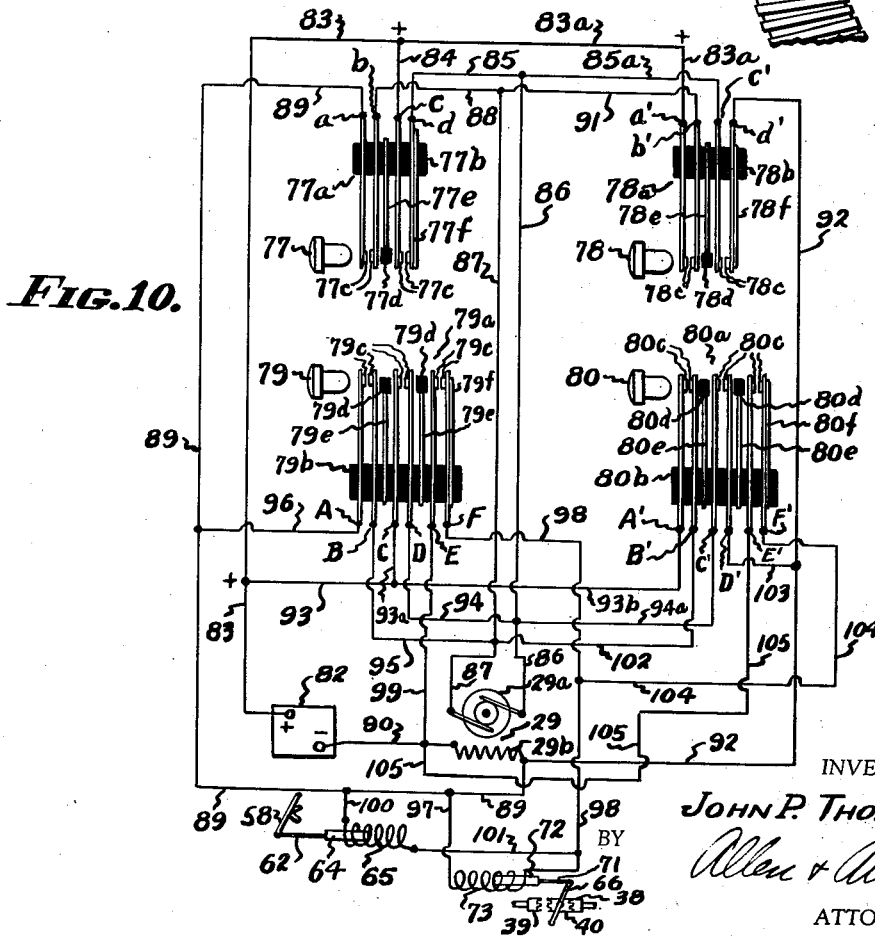
INVENTOR.
JOHN P. THOMPSON.
BY
ATTORNEYS.

Patented July 6, 1937

2,086,142

UNITED STATES PATENT OFFICE 2,086,142

MOTOR VEHICLE ELEVATING AND PARKING DEVICE

John P. Thompson, Cincinnati, Ohio

Application November 28, 1934, Serial No. 755,177

10 Claims. (Cl. 180—1)

My invention relates to vehicle jacks, and also to devices for shifting vehicles laterally, as in parking on streets, or as in storing or parking in parking lots or in garages, or wherever it is desired to bring the vehicle into a given space which is not readily accessible by use of the running gear of the vehicle itself.

One object of my invention is to provide a very readily managed device for elevating or jacking up the vehicle by the use of power, preferably operatable by the occupant of the vehicle without leaving the vehicle.

A further object is to provide such a device of such construction and relation to the vehicle structure that the operation of elevating or jacking up the vehicle does not impose strains on the vehicle structure which might be damaging thereto. The ordinary jack lifts one corner of the vehicle only; whereas it is an object of my invention, using power and therefore not objectionable as would be the case if manual labor were required, to elevate all four corners of the vehicle, that is, raise it bodily, whether the work required, as replacing a tire, requires all four wheels off the ground at the same time, or not.

A further object is to provide for the elevating or jacking operation with proper safeguards against tipping of the vehicle, either while being elevated or lowered again from its elevated position, and while elevated. The usual hand operated jack leaves the vehicle in a very unstable condition while a part of it is raised from the ground, liable to be moved sidewise, with a tipping of the jack, making it dangerous to one working on the vehicle, as well as being liable to damage the vehicle by the fall thereof from elevated position.

A further object is to provide for the sidewise or parking travel of the vehicle, while it is raised bodily from the ground by the elevating or jacking device under the conditions just mentioned, also preferably by power means.

A further object is to effect the sidewise travel or parking by the same motive means that has effected the elevating or jacking operation; and preferably by a motive means distinct from that of the vehicle, so that the elevating or jacking operation, and the sideways travel or parking operation, if used, is independent of the running of the vehicle motive device. For instance, it may be necessary to jack up or park the vehicle although the engine thereof is disabled; whereupon a jacking or parking device that is dependent upon that engine would not be available, at least for power operation.

A further object is to provide for safety in the parking travel, either into or out of parking position, by suitable braking means associated with the mechanism which effects the parking movement, preferably acting automatically upon cessation of the parking movement in either direction; whereby, as on a crowded street, and parking in a very limited space, complete control is afforded for the operator, preferably while seated in the vehicles, to avoid damage to other vehicles, as well as possible damage to persons on the sidewalk or in other places adjacent to the vehicle being parked. This is best provided for by making the braking means automatically operative as above mentioned, and it is my preferred object to so provide it, although I am not limited to such automatic operation of the braking means.

Other objects will appear in the course of the following description, illustrated by the drawings, in which—

Figure 6 is a plan view, partly in section on the horizontal line 6—6 of Fig. 2, enlarged, showing the details of construction of the control mechanism associated with the motive means, partly shown.

Figure 7 is a vertical longitudinal section of the same, on the line 7—7 of Fig. 1.

Figure 8 is a vertical cross section of the same, on the line 8—8 of Fig. 7, more fully illustrating the construction of the braking device for the parking mechanism.

Figure 9 is a face view of the control board and part of its connection to the control device.

Figure 10 is a diagrammatic view of the electrical connections, with the switch or contact means illustrated in conventional detail.

Figure 1:
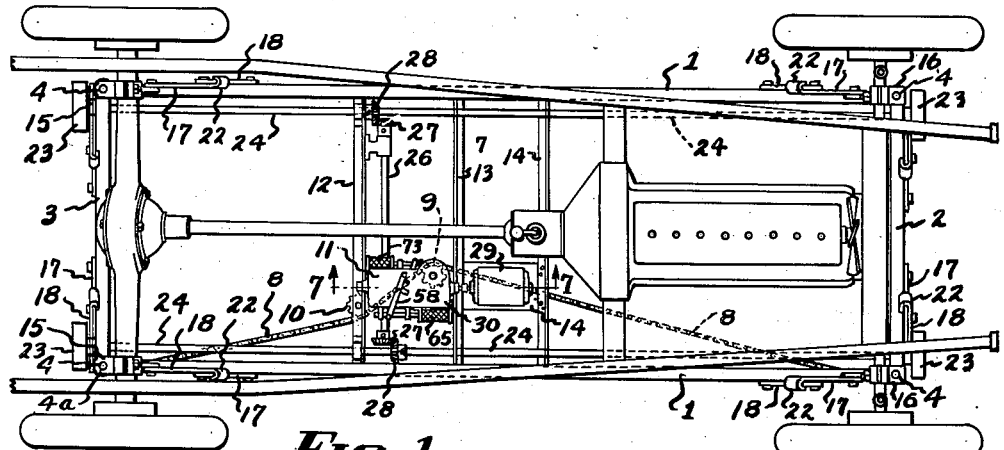
Figure 1 is a plan view of the chassis of a passenger motor vehicle of well known design, equipped with a device embodying my invention.
Figure 2:
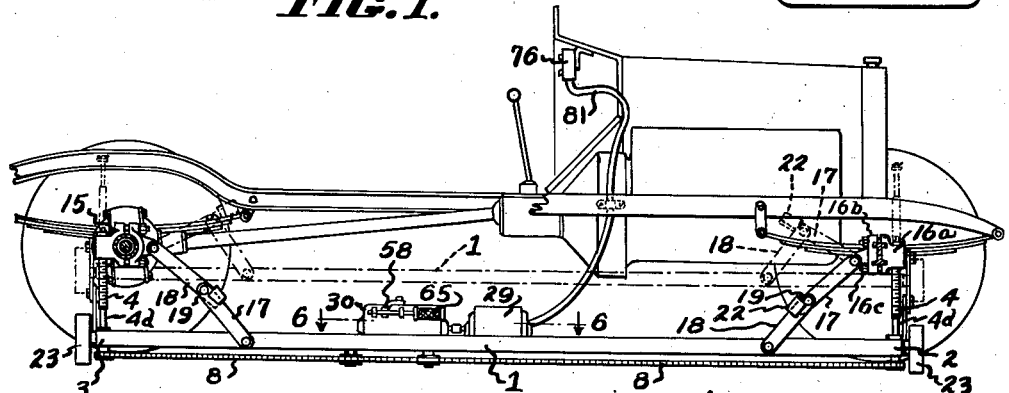
Figure 2 is a side elevation of the same, my device being in the position in which it is holding the vehicle in elevated position, parts of the vehicle being in vertical section.
Figure 3:
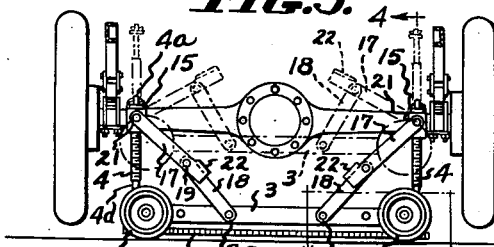
Figure 3 is a rear elevation of the same, with the parts in the positions that correspond to those of the parts as illustrated in Fig. 2.
Figure 4:
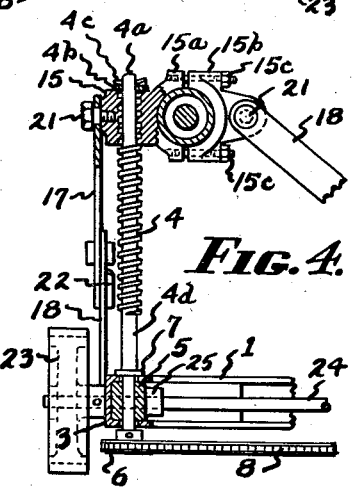
Figure 4 is an enlarged detail view corresponding to that of Fig. 2 at the left end of the figure, the section being on the plane of the vertical line 4—4 of Fig. 3.

As hereinbefore stated, one of my objects is to apply the elevating force to the vehicle in such a manner as not to impose unequal strains on the vehicle construction. I provide for this, in the example herein, by a rectangular frame having side members 1 and a front member 2 and a rear member 3; the members 1 lying substantially under the respective side members of the chassis of the vehicle, and the front and rear members 2 and 3 lying, respectively, substantially under the front and rear axles of the vehicle, as seen in Figs. 1 and 2. At the respective corners of this frame, jack screws 4 have bearings 5 in the frame. Extensions of these screws 4 below the bearings have fixed on them respective sprocket wheels 6; and above the bearings 5, collars 7 are fixed on the respective screws 4, so that, with the wheels 6 below and the collars above the bearings, vertical end play of the screws is practically prevented. A sprocket chain 8 passes around all of the sprocket wheels 6, following a generally four sided path, modified in that the chain 8 extends in to pass around a driving sprocket wheel 9, to which it is guided by an idler 10, these being parts of the driving and control mechanism 11, which is mounted about midway of the front-to-rear length of the vehicle chassis and somewhat to one side thereof; being supported on suitable cross members 12, 13 and 14 having their ends fixed to the side members of the chassis frame as clearly shown in Fig. 1. This mechanism will later be fully described.

It will be seen that power applied to this mechanism 11 will drive all of the screws 4 in the same direction, and, the sprocket wheels 6 of the screws being all of the same effective diameter, all the four screws will be driven at the same speed. They will lower the frame until it is supported on the ground or floor, and then elevation will begin with continued operation of the screws. This is effected by threading the screws 4 into suitable nut members on the vehicle axles; these members being substantially alike, except that the rear members 15 are made to fit the cylindrical rear-axis casing, and the front members 16 are made to fit the I-beam shape of the front axle of the vehicle. Each member is made in sections, 15a and 15b for the rear member 15, and 16a and 16b for the front member 16; the sections facing each other in straddling the respective axle structure, and being clamped by bolts 15c and 16c, respectively, so as to have very rigid attachment to the axles. The nut portion of each front member 16 extends forward, and the nut portion of each rear member 15 extends rearward.

So that the stability of the vehicle will not depend upon the stiffness of the screws 4, I provide braces, each comprising two sections 17 and 18 with adjacent end portions pivoted together at 19, and each lower section 17 having a pivotal connection 20 near its lower end to the frame, while the upper section 18 has a pivotal connection 21 near its upper end to a respective nut member 15 or 16. Each jack device has two of these braces, one transversely acting, connected to the outer end of the respective nut member 15 or 16 and to the rear member 3 or the front member 2 of the frame, as the case may be; and the other longitudinally acting, connected to the side of an ear on the inner end of the respective nut member and to the side member 1 of the frame. The upper section 18 has a lip or lug 22 which engages the top edge of the adjacent part of the lower section 17 when the maximum elevation has been reached, limiting the extension of the bracing sections short of alinement; so that each brace may act as a tension member but not as a compression member, and thus be capable of folding automatically upon beginning of lowering operation. As there is a tension brace in each direction at each screw, the bracing effect is fully attained.

The mechanism so far described is sufficient for merely elevating or jacking up the vehicle, with proper means on the frame to bear on the ground or floor as a support for the frame. It will be noted that the maximum elevation is reached when the screws become unthreaded from the nut members as the latter reach the upper ends of the threads of the screws; the latter having extensions 4a, unthreaded, occupying the nut members at this time, preferably with washers 4b and cotter pins 4c above the nut members to limit displacement of the vehicle upward from the screws when the threads are no longer in mesh. As soon as the screws are reversed in rotation, the weight of the vehicle will cause the nut members 15 and 16 to again mesh with the screw threads, and follow them downwardly in a controlled operation, stopping, when unmeshed at the lower ends of the threads, on lower parts 4d.

Figure 5:
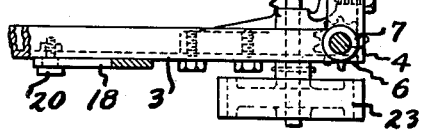
Figure 5 is an enlarged detail view of the same part of my device, the section being on the plane of the horizontal line 5—5 of Fig. 3.

The parking function is provided for by mounting the frame on wheels or rollers 23, which thus become the means that engages the floor or ground, for the elevating and lowering operation. Shafts 24 extend along the side members 1 of the frame, just inward therefrom, with bearings 25 in the corner parts of the frame, as best seen in Fig. 5, and have extensions out past the bearings 25, on which the respective wheels or rollers 23 are fixed. A parking driving shaft 26 extends laterally in both directions from the driving and control mechanism 11, transversely of the device and the vehicle, and has fixed on its respective end parts bevel gears 27 that mesh with bevel gears 28 fixed on the respective longitudinal shafts 24 that carry the wheels or rollers 23; one bevel gear 28 being forward and the other rearward of its meshing bevel gear 27, so that the wheels or rollers 23 all are driven in the same direction at one time. Reversal of the direction of rotation of the four wheels or rollers 23 of course is provided for; so that the vehicle may be driven sidewise into a space, or out of it; this provision being in the driving and controlling device 11, which will now be described in detail.

A motor 29, electrically driven, as from the storage battery of the vehicle, is mounted forwardly of the casing 30 and has coupled to its shaft the main driving shaft 31, as best seen in Figs. 6 and 7, extending from end to end of the casing 30 and having bearings 32 and 33 therein, as well as two intermediate bearings 34 and 35 on extensions from the top wall of the casing. The latter bearings embrace journal necks of worms 36 and 37, respectively, held from endwise movement along the shaft between the bearings 32 and 34 and 33 and 35, and being rotatable with the shaft only by means of clutch members 38 and 39, respectively, fixed on or integral with the worm necks at the other sides of the bearings 34 and 35, respectively and facing each other for being meshed by a clutch member 40 splined on the driving shaft 31 to alternatively mesh one or the other worm clutch member 38 or 39.

The worm 36 nearer the motor 29 meshes with a worm gear 41 fixed on the vertical shaft 42 which has bearings 43 and 44 in the top and bottom walls of the casing 30, with an extension below the bottom of the casing, on which is fixed the sprocket wheel 9, before mentioned as being meshed with the chain 8 that meshes with the sprocket wheels 6 of the four jack screws 4. Clutching this worm to the shaft 31 thus drives the jack screws 4 to elevate or lower the vehicle, accordingly as the motor 29 is driven in one or the other direction. As the elevation ceases by unmeshing of the screw threads, and elevation of the device ceases after the vehicle has come to rest on the floor or ground, also by unmeshing of the screw threads at the lower parts 4d of the screws, as before explained, no special means is required for stopping the device at either end of the jacking operation.

Clutching the other worm 37 to the main shaft 31 causes sidewise travel of the device with the vehicle supported thereon, by means of a worm gear 45 fixed on the transverse shaft 26, before mentioned, that extends transversely of the device and has bearings 46 in the side walls of the casing 30; this worm gear 45 meshing with the worm 37. The transverse travel is effected in one direction or the other by reversal of the electric motor 29. Here, braking is important, for safety, as previously mentioned. This is provided for by fixing a brake drum 47 on the clutch member 39 of the worm 37, and by mounting a pair of brake band sections 48 on an upstanding lug 49 on the bottom of the casing 30, as best seen in Fig. 8; these sections 48 extending around the drum 47 and having fixed to their upper ends ears 50 extending up through a slot 51 in the top of the casing 30. Just below the top of the casing, a rod 52 extends through openings in the ears and has its opposite ends slidably bearing in bores of screws 53 threaded through the casing walls and compressing helical springs 54 between them and the respective ears; the springs surrounding the rod. These springs 54 normally hold the brake band sections 48 in braking relation to the drum 47, with a force that may be adjusted by means of the screws 53. They are withdrawn from the drum by means of toggle links 55 pivoted at 56 to the upper ends of the ears 50 above the top of the casing 30, and pivoted at 57 to each other and to an operating lever 58 having fulcrum at 59 on the casing top.

This operating lever 58 extends out past one side of the casing 30 and has a slot 60 receiving a pin 61 fixed in a bar 62 sliding in guides 63 on the casing 30 and having one end connected to the armature 64 of a solenoid 65 also mounted on the side of the casing 30. This solenoid has its coil so included in circuit with the electric motor 29 that when the motor is started in either direction, the solenoid is energized and acts to release the brake device; but as soon as the motor current is interrupted, that of the solenoid also is, and the solenoid being de-energized, the springs 54 set the brake device and promptly stop the transverse travel of the device and the vehicle carried thereon.

The clutch member 40 is slid on the shaft 31 to connect either the jacking or the parking mechanism to the motor, also electrically, by means of the clutch lever 66 fulcrumed at 67 on the casing wall and having a middle enlarged rounded part 68 to engage in the annular groove 69 of the member 40; the free end of the lever 66 being pivoted slidably by pin 70 to bar 71 connected to the armature 72 of a second solenoid 73 on the opposite side of the casing 30, which has guides 74 for this bar. A spring 75 is stretched from this lever 66 to one side of the casing 30, to hold the clutch member 40 in engagement with the clutch member 38 of the worm 36 that drives the elevating and lowering mechanism. Thus, if the motor 29 is driven in either direction without energizing the solenoid 73, the vehicle will be raised or lowered, according to the direction of running of the motor. If the solenoid 73 is energized while the motor is running in either direction, the device, with the vehicle thereon, will be driven to the right or left, according to the direction of running of the motor. Also, as the springs 54 keep the brake 47, 48 set unless the solenoid 65 is energized, this solenoid 65 must be energized when the other solenoid 73 is energized, to allow the transverse travel mechanism to operate under action of the clutch member 40 engaged with the clutch member 39 of this mechanism by the action of this other solenoid 73.

I provide a means for effecting the various electrical connections for these several operations, conveniently reached by the occupant of the car, preferably mounted on the dash board of the car, and generally indicated at 76 in Fig. 2, and illustrated in Fig. 9 as a casing from the face of which extend four buttons 77, 78, 79 and 80, with designations on the face of the casing, "Lower car", "Lift car", "Drive left" and "Drive right", with arrows pointing in the corresponding directions for more ready observance. A flexible conduit 81 leads from the bottom of this casing, through which it will be understood that the several connecting wires extend to the motor and the two solenoids, as well as to a battery supplying the current. The preferred arrangement of the wiring is indicated diagrammatically in Fig. 10, with suitable multiple-tongue switches 77a, 78a, 79a, and 80a, served by the respective buttons, shown somewhat in detail.

Considering first the "lower car" button 77 and its switch 77a, this switch has four tongues a, b, c, and d mounted in an insulating base 77b, in two pairs, a and b, and c and d. The tongues are of resilient metal, and near their free ends have contact points 77c, the points of a pair facing each other. An insulating spacer 77d is mounted between the two pairs of tongues on a resilient prong 77e also fixed in base 77b; and a backing strip 77f is provided for the tongue d farthest from the button 77. When the button 77 is pressed, it bends tongues a, b, and c and prong 77e toward the fourth tongue d; bringing all contact points 77c that face each other into electrical contact. The switch thus can complete two circuits at the same time, under pressure on the button.

The "lift car" switch 78a is of construction the same as that of the just described switch 77a, with tongues a', b', c', and d', mounted in a base 78b and having points 78c, and having the spacer 78d on the prong 78e; and having the backing strip 78f for tongue d'.

The "drive left" switch 79a has six tongues in three pairs, with two spacers for adjacent pairs; the tongues being designated A, B, C, D, E, and F; and being in pairs A and B, C and D, and E and F. They have the insulating base 79b, and have contact points 79c, those of pairs facing each other; and the spacers 79d are mounted on the resilient prongs 79e, while the tongue F farthest from the button 79 has the backing strip 79f. This switch thus can complete three circuits at a time.

The "drive right" switch 80a is constructed the same as the just described switch 79a, with tongues A', B', C', D', E', and F', mounted in a base 80b and having points 80c, and having the spacers 80d on the prongs 80e; and having the backing strip 80f for the tongue F'.

When the "lower car" button 77 is pressed in, the circuit is from storage battery 82 through connections 83, 84 to tongue c, to tongue d, through connections 85, 86 to motor armature 29a, through connections 87, 88 to tongue b, to tongue a, through connection 89 to motor field 29b, and through connection 90 to the battery 82. The motor is thus run in one direction; and there having been no current through solenoid 73, clutch members 38 and 40 remain meshed under action of spring 75, and the vehicle is lowered, supposing it to have been in raised position, by the jack mechanism operating as previously described.

When "lift car" button 78 is pressed in, the circuit is from battery 82 through connections 83, 83a to tongue a', to tongue b', through connections 91, 87 to the other side of the motor armature 29a, through connections 86, 85a to tongue c', to tongue d', through connection 92 to motor field 29b, and through connection 90 to battery 82. The motor is thus run in the opposite direction, clutch members 38 and 40 remaining meshed by spring 75, as the solenoid 73 was not energized. The car is thus lifted by the jack mechanism acting as previously described.

Supposing the vehicle having been elevated by the operation from pressing button 78 as just described; if the "drive left" button 79 is pressed in, the circuit is from battery 82, through connections 83, 93, 93a to tongue C, to tongue D, through connections 94, 86 to motor armature 29a, through connections 87, 95 to tongue B, to tongue A, through connections 96, 89 to motor field 29b, and through connection 90 to battery 82. In this case, with the third pair of tongues E and F, shunt connections are made through the solenoids 73 and 65, to shift clutch member 40 and release the brake 47, 48, respectively. This shunt for solenoid 73 is from connector 89, through connector 97, solenoid 73, connector 98 to tongue F, to tongue E, and through connectors 99, 90 to battery 82. The shunt for solenoid 65 is from connector 89, through connector 100 to solenoid 65, through connectors 101, 98 to tongue F, to tongue E, and through connectors 99, 90 to battery 82. The device thus would be driven to the left, with the elevated vehicle thereon, by the mechanism as previously described.

When the "drive right" button 80 is pressed in, the circuit is from the battery 82, through connectors 83, 93, 93b to tongue A', to tongue B', through connectors 102, 87 to the other side of the motor armature 29a, through connectors 86, 94a to tongue C', to tongue D', through connectors 103, 92 to motor field 29b, and through connector 90 to battery 82. The motor is thus run in the opposite direction; and the solenoids 65 and 73 are energized through shunt connections by the contact of tongues E' and F'. The shunt for solenoid 73 is from conductor 92, through conductors 89, 97 to solenoid 73, through conductors 98, 104 to tongue F', to tongue E', and through conductors 105, 90 to battery 82. The shunt for solenoid 65 is from conductor 92 through conductors 89, 100, to solenoid 65, through conductors 101, 98, 104 to tongue F', to tongue E', and through conductors 105, 90 to battery 82. The device thus would be driven to the right, with the elevated vehicle thereon, by the mechanism, operated by motor 29 running in reverse direction.

I have shown the device driven by an electric motor supplied with current from a storage battery 82, which, as will be understood, would be the regular storage battery of the motor vehicle. Another source of current could be the vehicle generator, directly supplying to the motor 29. Also, it will be understood that I am not in all respects limited to electrical driving; mechanical connection with the vehicle engine being an example of modified driving source. In an electrically driven vehicle, its storage batteries could supply the current. Other modifications of the mechanism, and of the control devices, may occur. It will be understood, therefore, that I am not limited to the specific disclosure, but what I claim as new and desire to secure by Letters Patent is:

1. In a device of the character described, a rigid frame to lie under the chassis of a vehicle, with corner portions under respective axles of the vehicle, jackscrews journaled in the respective corner portions of the frame and upstanding therefrom, members adapted to retentively engage adjacent portions of the vehicle axles and each comprising nut portions in which the threads of the respective jackscrews are adapted to run, each jackscrew being devoid of threads near its lower end next to the frame and near its upper end, so that the respective nut portion ceases to be driven axially by the jackscrews when at a desired lowermost position and when at a desired uppermost position, and driving means mounted on said frame and means operatively connecting the said driving means to the several jackscrews to rotate said screws in one direction or another.

2. In a device of the character described, a rigid frame to lie under the chassis of a vehicle, with corner portions under respective axles of the vehicle, jackscrews journaled in the respective corner portions of the frame and upstanding therefrom, members adapted to retentively engage adjacent portions of the vehicle axles and each comprising nut portions in which the threads of the respective jackscrews are adapted to run, each jackscrew being devoid of threads near its lower end next to the frame and near its upper end, so that the respective nut portion ceases to be driven axially by the jackscrews when at a desired lowermost position and when at a desired uppermost position, and driving means mounted on said frame and means operatively connecting the said driving means to the several jackscrews to rotate said screws in one direction or another, the means operatively connecting the driving means to the jackscrews comprising an endless flexible element running around the sides and ends of said frame, operatively engaging the said jackscrews and operatively engaging the driving means.

3. In a device of the character described, a rigid frame to lie under the chassis of a vehicle, with corner portions under respective axles of the vehicle, jackscrews journaled in the respective corner portions of the frame and upstanding therefrom, members adapted to retentively engage adjacent portions of the vehicle axles and each comprising nut portions in which the threads of the respective jackscrews are adapted to run, each jackscrew being devoid of threads near its lower end next to the frame and near its upper end, so that the respective nut portion ceases to be driven axially by the jackscrews when at a desired lowermost position and when at a desired uppermost position, and driving means mounted on said frame and means operatively connecting the said driving means to the several jackscrews to rotate said screws in one direction or another, shafts extending along opposite longitudinal sides of said frame and journaled on said frame, rollers fixed on said shafts at the respective ends of the frame, on which the frame and the vehicle may travel laterally when the vehicle is raised on the frame by said jackscrews, and means operatively connecting said shafts to the same driving means that drives the jackscrews, and comprising engageable and disengageable means whereby the jackscrews and the rollers may be driven alternatively by said driving means.

4. In a device of the character described, a rectangular elongated frame to lie under the chassis of a vehicle, elevating devices at the respective corners of the frame, upstanding to operatively engage with the vehicle chassis for raising and lowering the vehicle, rollers at the respective corners of the frame, on which the frame may travel laterally, a sprocket chain running around said frame and operatively connected to the several elevating means, a driving device within the frame, with which said chain operatively engages, shafts, one at each longitudinal side of the frame, connecting the rollers at the respective side of the frame, a shaft extending transversely of said frame, operatively engaged by said driving means, and operatively connected to the respective longitudinal shafts, and means for alternatively disconnecting said transverse shaft and said chain from said driving means.

5. In a device of the character described, a supporting structure to lie under the chassis of a vehicle with portions under respective corner parts of the chassis, elevating devices on the respective portions, engageable with respective adjacent portions of the chassis, means for operating the several elevating means, and braces, each comprising two members with ends pivoted together, said members, respectively, pivotally engaging the vehicle chassis and the supporting means, one member having means to engage the other member, to prevent the two members from passing into alinement when the vehicle is elevated, but causing the brace to act as a tension member in its bracing function, yet be automatically collapsible when the vehicle is lowered on the support.

6. In a device of the character described, a supporting structure to lie under the chassis of a vehicle, having portions to lie under respective corners of said chassis, raising and lowering devices on the respective corners of said supporting means, rollers on the respective ones of said corners, on which the supporting means may travel laterally, a chain running around edge portions of the supporting means and operatively connected to the several raising and lowering means, shafts extending along respective lateral sides of the supporting means, each operatively connected to the rollers at the respective side of the supporting means, a motive device mounted on said supporting means, a shaft connected to said motive device, gear means loosely mounted on said shaft and operatively connected, respectively, to said chain and the aforementioned shafts, said gear means having clutch elements facing each other along said shaft, a clutch member slidably mounted on said shaft to rotate therewith, between said clutch elements, means for sliding said clutch member to alternatively connect with said clutch elements, and means for operating the clutch-member-sliding means, operatable at the driver's position on the vehicle.

7. A device as set forth in claim 6, wherein there is a brake member rotatable with the gear means that is connected to the lateral-driving shafts, and brake means engageable and disengageable with said brake member, accordingly as the motive means is stopped or started.

8. A device as set forth in claim 6, wherein there is a brake member rotatable with the gear means that is connected to the lateral-driving shafts, and brake means engageable and disengageable with said brake member, accordingly as the motive means is stopped or started, the motive means being an electric motor, and the device including an electro-magnet, with means to move the braking means into and out of disengagement with the brake member, the electro-magnet and the motor being in circuit with a current source, and said circuit including a switch, as the control means at the driver's position.

9. In a device of the character described, a rigid structure designed to travel along a surface and comprising means to raise or lower a vehicle, said structure being supported by the vehicle when the vehicle is lowered onto said surface, and the vehicle being supported by said structure when the vehicle is raised on said structure, driving means on said structure, and operative connections alternatively engageable with said driving means to elevate the vehicle on said structure, then move the structure and vehicle laterally, and then lower the vehicle, the driving means comprising a motor distinct from the motor that normally drives the vehicle, and the device comprising means whereby the driver of the vehicle, in driving position on the vehicle may selectively operate the driving mechanism for the raising and lowering operations and the lateral travel, the means for selectively operating the driving mechanism comprising a clutch which may connect the motor either to the raising and lowering means or to the means for causing lateral travel, an electro-magnetic means for operating said clutch, and a circuit including said electro-magnetic means with a source of current, and a switch means connected with said circuit for controlling the supply of current to said electro-magnetic means.

10. In a device of the character described, a rigid structure designed to travel along a surface and comprising means to raise or lower a vehicle, said structure being supported by the vehicle when the vehicle is lowered onto said surface, and the vehicle being supported by said structure when the vehicle is raised on said structure, driving means on said structure, and operative connections alternatively engageable with said driving means to elevate the vehicle on said structure, then move the structure and vehicle laterally, and then lower the vehicle, the driving means comprising a motor distinct from the motor that normally drives the vehicle, and the device comprising means whereby the driver of the vehicle, in driving position on the vehicle may selectively operate the driving mechanism for the raising and lowering operations and the lateral travel, a brake for the lateral travel means, and electro-magnetic means to operate said brake, the motor of the driving means being electric and said motor and said electro-magnetic means being electrically connected in a circuit whereby the brake is released when the motor is started and set when supply of current to the motor is stopped.

JOHN P. THOMPSON.